US010015055B2

(12) United States Patent
Ohwada

(10) Patent No.: US 10,015,055 B2
(45) Date of Patent: Jul. 3, 2018

(54) MANAGEMENT SYSTEM, COMMUNICATION TERMINAL, COMMUNICATION SYSTEM, METHOD OF MANAGEMENT, AND COMPUTER PROGRAM PRODUCT

(71) Applicant: Toshikazu Ohwada, Chiba (JP)

(72) Inventor: Toshikazu Ohwada, Chiba (JP)

(73) Assignee: RICOH COMPANY, LTD., Tokyo (JP)

(*) Notice: Subject to any disclaimer, the term of this patent is extended or adjusted under 35 U.S.C. 154(b) by 235 days.

(21) Appl. No.: 14/963,944

(22) Filed: Dec. 9, 2015

(65) Prior Publication Data

US 2016/0191328 A1    Jun. 30, 2016

(30) Foreign Application Priority Data

Dec. 25, 2014   (JP) .................. 2014-262608

(51) Int. Cl.
| | |
|---|---|
| *H04L 12/24* | (2006.01) |
| *G06Q 10/10* | (2012.01) |
| *G06Q 30/00* | (2012.01) |
| *H04L 29/08* | (2006.01) |

(52) U.S. Cl.
CPC ............ *H04L 41/12* (2013.01); *G06Q 10/10* (2013.01); *G06Q 30/016* (2013.01); *H04L 67/14* (2013.01); *H04L 67/30* (2013.01)

(58) Field of Classification Search
CPC ......... H04L 41/12; H04L 67/14; H04L 67/30; G06Q 10/10; G06Q 30/016
See application file for complete search history.

(56) References Cited

U.S. PATENT DOCUMENTS

| | | | |
|---|---|---|---|
| 5,519,773 A | 5/1996 | Dumas et al. | |
| 2003/0041105 A1* | 2/2003 | Patrick ................ | G06Q 10/02 709/203 |
| 2007/0239474 A1 | 10/2007 | Christie | |
| 2014/0267565 A1* | 9/2014 | Nakafuji ................ | H04N 7/141 348/14.08 |

FOREIGN PATENT DOCUMENTS

| | | |
|---|---|---|
| EP | 1 426 887 A1 | 6/2004 |
| JP | 2005-064860 | 3/2005 |
| JP | 2014-200063 | 10/2014 |

OTHER PUBLICATIONS

Extended European Search Report dated Apr. 26, 2016 in European Application No. 15200313.3.

* cited by examiner

*Primary Examiner* — Kim T Nguyen
(74) *Attorney, Agent, or Firm* — Oblon, McClelland, Maier & Neustadt, L.L.P.

(57) ABSTRACT

A management system includes a first management unit, a second management unit, and an updating unit. The first management unit manages identification information of a communication terminal classified into a first group. The second management unit manages identification information of a communication terminal classified into a second group. The updating unit updates information managed by the first management unit or the second management unit based on information transmitted from the communication terminals.

9 Claims, 9 Drawing Sheets

FIG.6A

| GUEST APP | RECEPTIONIST APP |
|---|---|
|  | 01cc |
|  |  |
|  |  |

FIG.6B

| GUEST APP | RECEPTIONIST APP |
|---|---|
|  | 01cc |
|  | 01dd |
|  |  |

FIG.6C

| GUEST APP | RECEPTIONIST APP |
|---|---|
|  | 01dd |
|  |  |
|  |  |

FIG.6D

| GUEST APP | RECEPTIONIST APP |
|---|---|
|  |  |
|  |  |
|  |  |

FIG.6E

| GUEST APP | RECEPTIONIST APP |
|---|---|
| 01aa |  |
|  |  |
|  |  |

FIG.6F

| GUEST APP | RECEPTIONIST APP |
|---|---|
| 01aa |  |
| 01bb |  |
|  |  |

FIG.6G

| GUEST APP | RECEPTIONIST APP |
|---|---|
| 01bb |  |
|  |  |
|  |  |

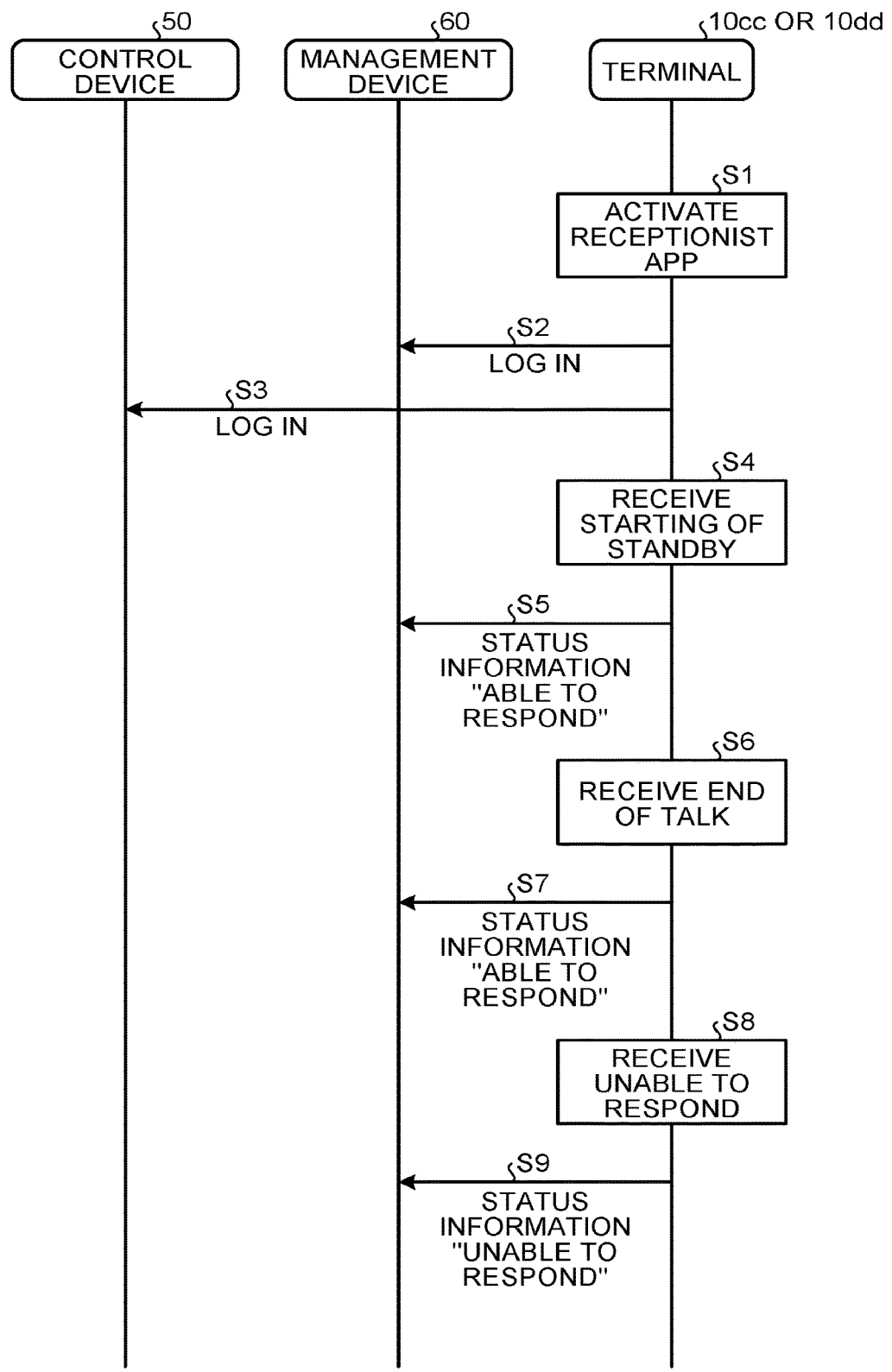

MANAGEMENT SYSTEM, COMMUNICATION TERMINAL, COMMUNICATION SYSTEM, METHOD OF MANAGEMENT, AND COMPUTER PROGRAM PRODUCT

CROSS-REFERENCE TO RELATED APPLICATIONS

The present application claims priority to and incorporates by reference the entire contents of Japanese Patent Application No. 2014-262608 filed in Japan on Dec. 25, 2014.

BACKGROUND OF THE INVENTION

1. Field of the Invention

The present invention relates to a management system, a communication terminal, a communication system, a method of management, and a computer program product.

2. Description of the Related Art

In recent years, a communication system that conducts a call, a meeting, and others via a communication network such as the Internet and a dedicated line has been widespread, along with requests to reduce expenses and time in transportation of the persons concerned. In such a communication system, when the communication is started between communication terminals, transmitting and receiving of content data such as image data and sound data are performed and the communication between the points is implemented.

In a communication system such as a teleconference system and IP telephones, in accordance with the respective protocols of call control, for a starting request of communication by one of the communication terminals, the other communication terminal permits to respond, and thereby the communication between the communication terminals is established.

Communication systems for a video conference system and others are now being employed at call centers. For example, such a method is disclosed that a call center device manages operator terminals currently being able to receive incoming calls and selects an operator terminal currently being able to receive incoming calls in response to a connecting request from a video phone (see Japanese Laid-open Patent Publication No. 2005-064860). With this method, the operator makes an incoming call receiving operation with the selected operator terminal, whereby the call center device opens a video and sound communication channel between the selected operator terminal and the video phone.

However, with a communication system employed in call centers and others, waiting is problematically caused in the start-requesting side or in the incoming call responding side if the number of communication terminals requesting a start is not balanced with the number of communication terminals responding to the call. In this case, if a connection between communication terminals is managed based only on a queue in an end, management of the connection between communication terminals is problematically difficult when waiting is caused in the other end.

SUMMARY OF THE INVENTION

It is an object of the present invention to at least partially solve the problems in the conventional technology.

According to an embodiment, a management system includes a first management unit, a second management unit, and an updating unit. The first management unit manages identification information of a communication terminal classified into a first group. The second management unit manages identification information of a communication terminal classified into a second group. The updating unit updates information managed by the first management unit or the second management unit: by deleting any piece of the identification information managed by the second management unit if one or more pieces of the identification information are managed by the second management unit when the communication terminal classified into the first group requests for starting of communication; by adding identification information of the communication terminal of a source of a starting request of communication to the first management unit if no pieces of the identification information are managed by the second management unit when the communication terminal classified into the first group requests for starting of the communication: by deleting any piece of the identification information managed by the first management unit if one or more pieces of the identification information are managed by the first management unit when the communication terminal classified into the second group turns into a state of being able to respond to the starting request of communication; and by adding identification information of the communication terminal having turned into a state of being able to respond to the second management unit if no pieces of the identification information are managed by the first management unit when the communication terminal classified into the second group turns into a state of being able to respond to the starting request of communication.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 6A to 6G are conceptual diagrams illustrating a standby-terminal management table;

FIG. 7 is a sequence diagram illustrating the processes in which the terminal transmits status information;

DETAILED DESCRIPTION OF THE PREFERRED EMBODIMENT

With reference to the accompanying drawings, the following describes an exemplary embodiment of the present invention.

Overall Configuration of Communication System

Figure 1:
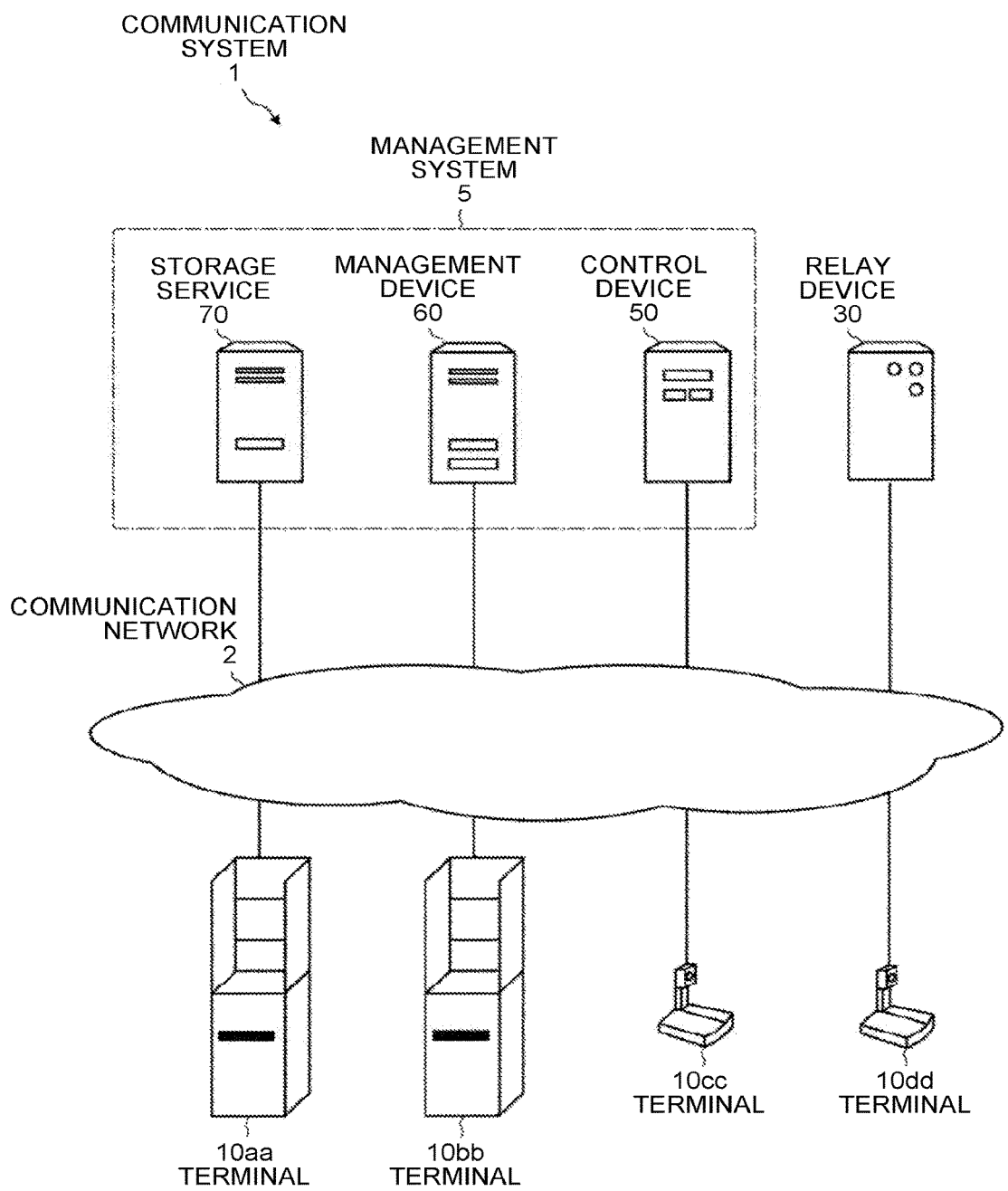
FIG. 1 is a diagram of an overall configuration of a communication system according to one embodiment.

With reference to FIG. 1, an overall configuration of a communication system according to an embodiment of the invention will be described first. FIG. 1 is a diagram of the overall configuration of the communication system in the embodiment. In the following description, a communication terminal is simply referred to as "terminal."

A communication system 1 according to the embodiment is structured with a plurality of terminals (10aa, 10bb, 10cc, 10dd), a relay device 30, and a management system 5. The management system 5 includes a control device 50, a management device 60, and a storage service 70. In the following description, any desired terminal out the terminals (10aa, 10bb, 10cc, 10dd) is described as "terminal 10." The terminal 10, the relay device 30, the control device 50, the management device 60, and the storage service 70 are connected to be able to perform communication with other terminals and devices via a communication network 2. The communication network 2 may include a local area network (LAN), the Internet, a mobile telephone network, or a dedicated line.

In the embodiment, the terminal 10 can use a reception service that is provided by the management system 5. For example, the terminals (10aa, 10bb) are installed at reception counters in companies, exhibitions and the like, and are used by guests. The terminals (10cc, 10dd) are installed at a call center, and are used by receptionists. Between the terminals (10aa, 10bb) and the terminals (10cc, 10dd), the communication is performed by transmitting and receiving content data, and thereby a talk can be made between the guest and the receptionist. In the communication system 1 in the embodiment illustrated in FIG. 1, in the terminals (10aa, 10bb) of the guest side, a main unit of the terminal having the hardware configuration the same as that of the terminals (10cc, 10dd) is housed in a cabinet in consideration of operability.

The storage service 70 manages information to access the management device 60. This information is a file for displaying a graphical user interface (GUI) to access the management device 60, for example. This file may be described in HyperText Markup Language (HTML), for example. This file is updated by accessing the storage service 70 from a personal computer (PC) and the like, and uploading a new file to the storage service side from the PC side. The storage service 70 transmits the above-described file to the terminal 10, and thereby causes the terminal 10 to access the management device 60.

The management device 60 manages a queue of the terminals 10 waiting for the starting of communication. The management device 60 manages the connection among the terminals 10 based on the queue. The control device 50 performs control to establish a session for transmitting content data among the terminals 10. Each terminal 10 transmits content data to the other terminal 10 participating in the same session. In the embodiment, a session is implemented by the relay device 30 relaying content data including image data and sound data among a plurality of terminals 10.

In the embodiment, the explanations of the communication system 1, the management system 5, and the terminal 10 will be given based on the assumption of a video conference system as one example of a communication system, a video-conference management system as one example of a communication management system, and a video conference terminal as one example of a communication terminal. That is, the terminal 10 and the management system 5 are not only applied to a video conference system but also applied to other communication systems. For example, the communication system 1 may be a telephone system, and the terminal 10 may be an Internet protocol (IP) telephone, an Internet telephone, a personal computer (PC), and the like. In the embodiment, "video conference" is substitutably used with "teleconference." Moreover, in the following description, conducting a call with a terminal (a moderate concept) such as a video conference terminal (a narrower concept) is explained. However, it is not limited to this, and it only needs to be capable of performing communication as a broader concept including the call.

Hardware Configuration in Embodiment

Figure 2:
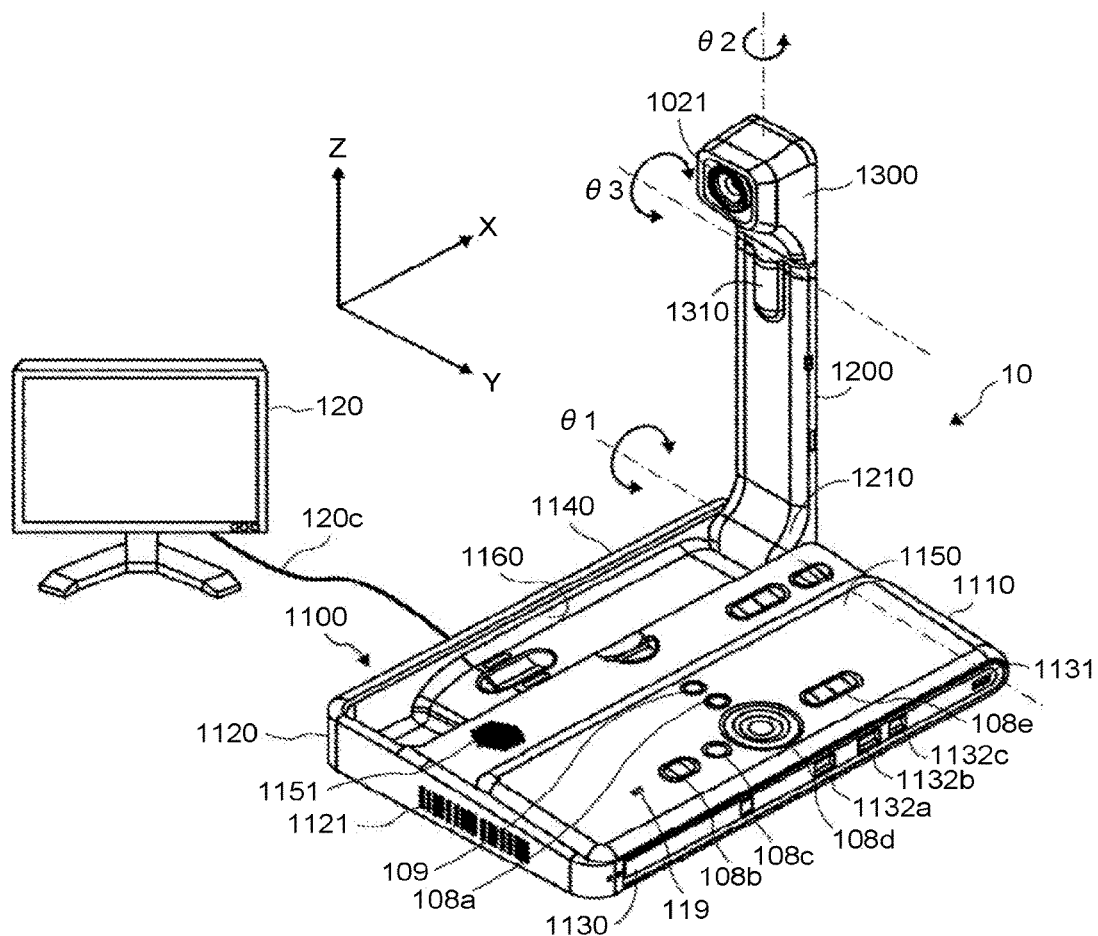
FIG. 2 is an external view of a terminal in the embodiment.

The hardware configuration in the embodiment will be described next. FIG. 2 is an external view of the terminal 10 in the embodiment. As illustrated in FIG. 2, the terminal 10 includes a housing 1100, an arm 1200, and a camera housing 1300. On an anterior wall surface 1110 of the housing 1100, an air intake surface formed with a plurality of air intake holes is provided, and on a posterior wall surface 1120 of the housing 1100, an exhaust surface 1121 on which a plurality of exhaust holes are formed is provided. Consequently, by the drive of a cooling fan built into the housing 1100, the outside air in the rear of the terminal 10 can be taken in via the air intake surface and exhausted toward the rear of the terminal 10 via the exhaust surface 1121. On a right-hand wall surface 1130 of the housing 1100, sound collecting holes 1131 are formed, and with a later-described built-in microphone 114, the sound of a voice, a sound, a noise, and others can be collected.

On the housing 1100 on the right-hand wall surface 1130 side, an operation panel 1150 is formed. On the operation panel 1150, a plurality of later-described operation buttons (108a to 108e), a later-described power switch 109, and a later-described alarm lamp 119 are provided, and a sound output surface 1151 on which a plurality of sound output holes are formed to pass through the output sound from a later-described built-in speaker 115 is formed. On the left-hand wall surface 1140 of the housing 1100, formed is a housing portion 1160 as a recessed portion to house therein the arm 1200 and the camera housing 1300. On the right-hand wall surface 1130 of the housing 1100, provided are a plurality of connection ports (1132a to 1132c) to electrically connect cables to a later-described external device connection I/F 118. Meanwhile, on a left-hand wall surface 1140 of the housing 1100, provided is a connection port to electrically connect a cable 120c for a display 120 to the later-described display I/F 117.

In the following description, explanation is made by using an "operation button 108" when indicating any desired operation button out of the operation buttons (108a to 108e), and by using a "connection port 1132" when indicating any desired connection port out of the connection ports (1132a to 1132c).

The arm 1200 is mounted on the housing 1100 via a torque hinge 1210, and is structured so that the arm 1200 is rotatable in an up-and-down direction in a range of a tilt angle θ1 of 135 degrees with respect to the housing 1100. FIG. 2 illustrates a state of the tilt angle θ1 being 90 degrees.

On the camera housing 1300, a later-described built-in camera 112 is provided, and a user, documents, a room, and others can be imaged thereby. On the camera housing 1300, a torque hinge 1310 is formed. The camera housing 1300 is mounted on the arm 1200 via the torque hinge 1310. The camera housing 1300 is mounted on the arm 1200 via the torque hinge 1310, and with respect to the arm 1200, is structured such that the camera housing 1300 is rotatable in the up-and-down direction and left-and-right direction in a range of a pan angle θ2 of ±180 degrees with the state illustrated in FIG. 2 as 0 degrees and a range of a tilt angle θ3 of ±45 degrees.

Note that the external view in FIG. 2 in the foregoing is one example purely, and it is not limited to this appearance. The terminal 10 may be a PC, a smartphone, and a tablet terminal of general purpose. The camera and the microphone do not necessarily need to be built-in, and may be external.

The appearance of the relay device 30, the control device 50, and the management device 60, and the storage service 70 is the same as that of a general server computer, and thus the explanation of the appearance is omitted.

Figure 3:
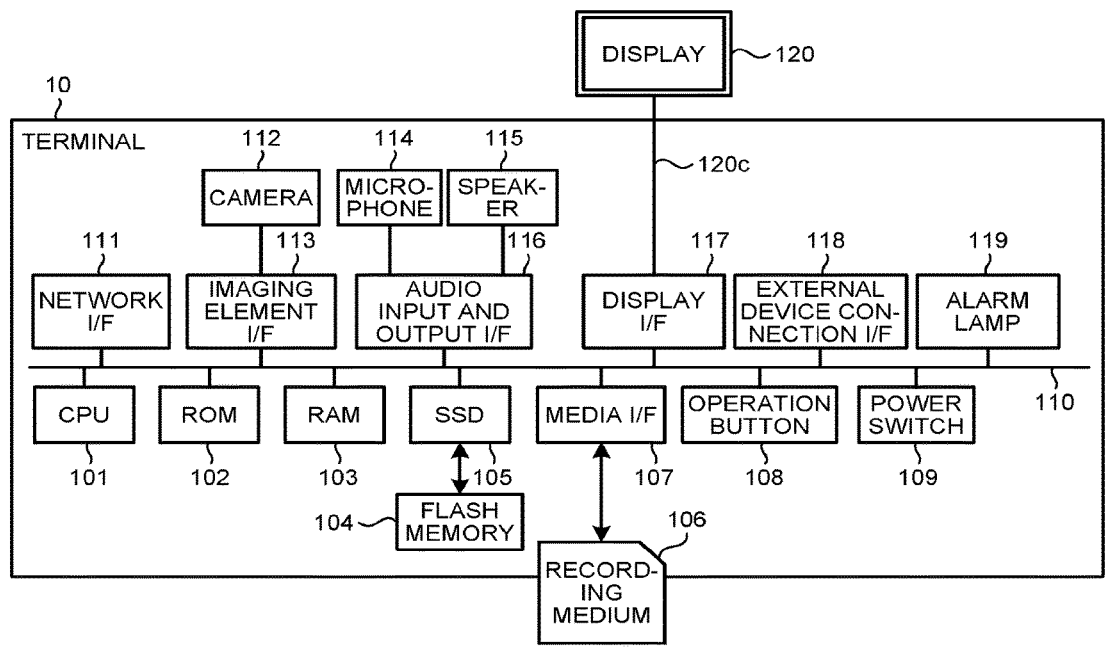
FIG. 3 is a block diagram of the hardware configuration of the terminal in the embodiment.

FIG. 3 is a block diagram of the hardware configuration of the terminal 10 in the embodiment. As illustrated in FIG. 3, the terminal 10 in the embodiment includes a central processing unit (CPU) 101 that controls the operation of a whole of the terminal 10, a read only memory (ROM) 102 that stores therein programs such as an initial program loader (IPL) used to drive the CPU 101, a random access memory (RAM) 103 that is used as a work area of the CPU 101, a flash memory 104 that stores therein various terminal programs of the terminal 10 and various types of data such as image data and audio data, a solid state drive (SSD) 105 that controls the reading and writing of various types of data to the flash memory 104 in accordance with the control of the CPU 101, a media I/F 107 that controls the reading and writing (storing) of data to a recording medium 106 such as a flash memory and an integrated circuit (IC) card, the operation buttons 108 that are operated such as when selecting a destination, the power switch 109 to turn the power of the terminal 10 on and off, and a network interface (I/F) 111 to perform data transmission by using the communication network 2.

The terminal 10 further includes the built-in camera 112 that images a subject and obtains image data in accordance with the control of the CPU 101, an imaging element I/F 113 that controls the drive of the camera 112, the built-in microphone 114 that inputs sound, the built-in speaker 115 that outputs the sound, an audio input and output I/F 116 that processes the input and output of audio signals between the microphone 114 and the speaker 115 in accordance with the control of the CPU 101, a display I/F 117 that transmits image data to the external display 120 in accordance with the control of the CPU 101, the external device connection I/F 118 to connect various external devices, the alarm lamp 119 that notifies of the abnormality of various functions of the terminal 10, and a bus line 110 such as an address bus and a data bus to electrically connect the foregoing constituent elements as illustrated in FIG. 3.

The display 120 is a display unit configured with liquid crystal or organic electroluminescence that displays an image of a subject and for operation. The display 120 is connected to the display I/F 117 with the cable 120c. This cable 120c may be a cable for an analog RGB (VGA) signal, may be a cable for a component video signal, and may be a cable for high-definition multimedia interface (HDMI, registered trademark) and a digital video interactive (DVI) signal.

The camera 112 includes a lens and a solid-state image sensing device that converts light into electrical charges and digitizes an image (video) of a subject, and as the solid-state image sensing device, a complementary metal oxide semiconductor (CMOS), a charge coupled device (CCD), or others are used.

To the external device connection I/F 118, with a universal serial bus (USB) cable and the like that is inserted to the connection port 1132 of the housing 1100, an external device such as an external camera, an external microphone, and an external speaker can be electrically connected. When an external camera is connected, in accordance with the control of the CPU 101, the external camera is driven in preference to the built-in camera 112. In the same manner, when an external microphone is connected and when an external speaker is connected, in accordance with the control of the CPU 101, the external microphone and the external speaker are driven in preference to the built-in microphone 114 and the built-in speaker 115, respectively.

The recording medium 106 is configured to be detachable with respect to the terminal 10. As long as it is a non-volatile memory that reads and writes data in accordance with the control of the CPU 101, it is not limited to the flash memory 104, and an electrically erasable and programmable ROM (EEPROM) and the like may be used.

Figure 4:
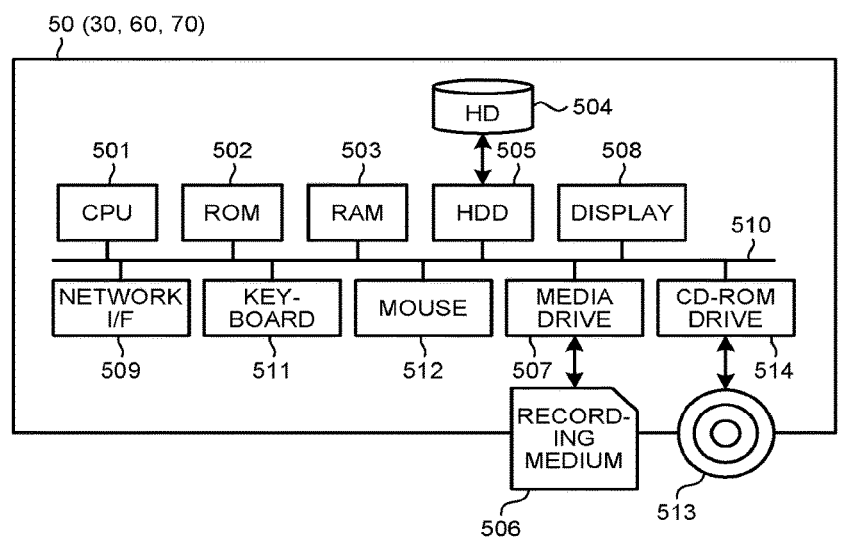
FIG. 4 is a block diagram of the hardware configuration of a control device, a management device, a storage service, and a relay device in the embodiment.

FIG. 4 is a block diagram of the hardware configuration of the control device 50 in the embodiment. The control device 50 includes a CPU 501 that controls the operation of a whole of the control device 50; a ROM 502 that stores therein programs used to drive the CPU 501 such as an IPL; a RAM 503 that is used as a work area of the CPU 501; an HD 504 that stores therein various types of data such as programs for the control device 50; a hard disk drive (HDD) 505 that controls the reading and writing of various types of data to the HD 504 in accordance with the control of the CPU 501; a media drive 507 that controls the reading and writing (storing) of data to a recording medium 506 such as a flash memory; a display 508 that displays various types of information such as cursors, menus, windows, characters, or images; a network I/F 509 to perform data communication by using the communication network 2; a keyboard 511 that is provided with a plurality of keys to input characters, numerical values, various instructions, and others; a mouse 512 to perform the selection and execution of various instructions, the selection of a processing object, the movement of a cursor, and others; a compact-disc read only memory (CD-ROM) drive 514 that controls the reading and writing of various types of data to a CD-ROM 513 as one example of a detachable recording medium; and a bus line 510 such as an address bus and a data bus to electrically connect the foregoing constituent elements as illustrated in FIG. 4.

The relay device 30, the management device 60, and the storage service 70 have the hardware configuration the same as that of the control device 50, and thus the explanation thereof is omitted.

The respective programs for the terminal 10, the relay device 30, the control device 50, the management device 60, and the storage service 70 may be recorded and distributed on a computer readable recording medium in a file of an installable format or of an executable format. The examples of the recording medium include a compact disc recordable (CD-R), a digital versatile disc (DVD), a Blu-ray (trademark) disc, and others. The recording medium such as a CD-ROM on which the respective programs are recorded and the HD 504 on which these programs are stored can be provided as a program product domestically or internationally.

Functional Configurations in Embodiment

Figure 5:
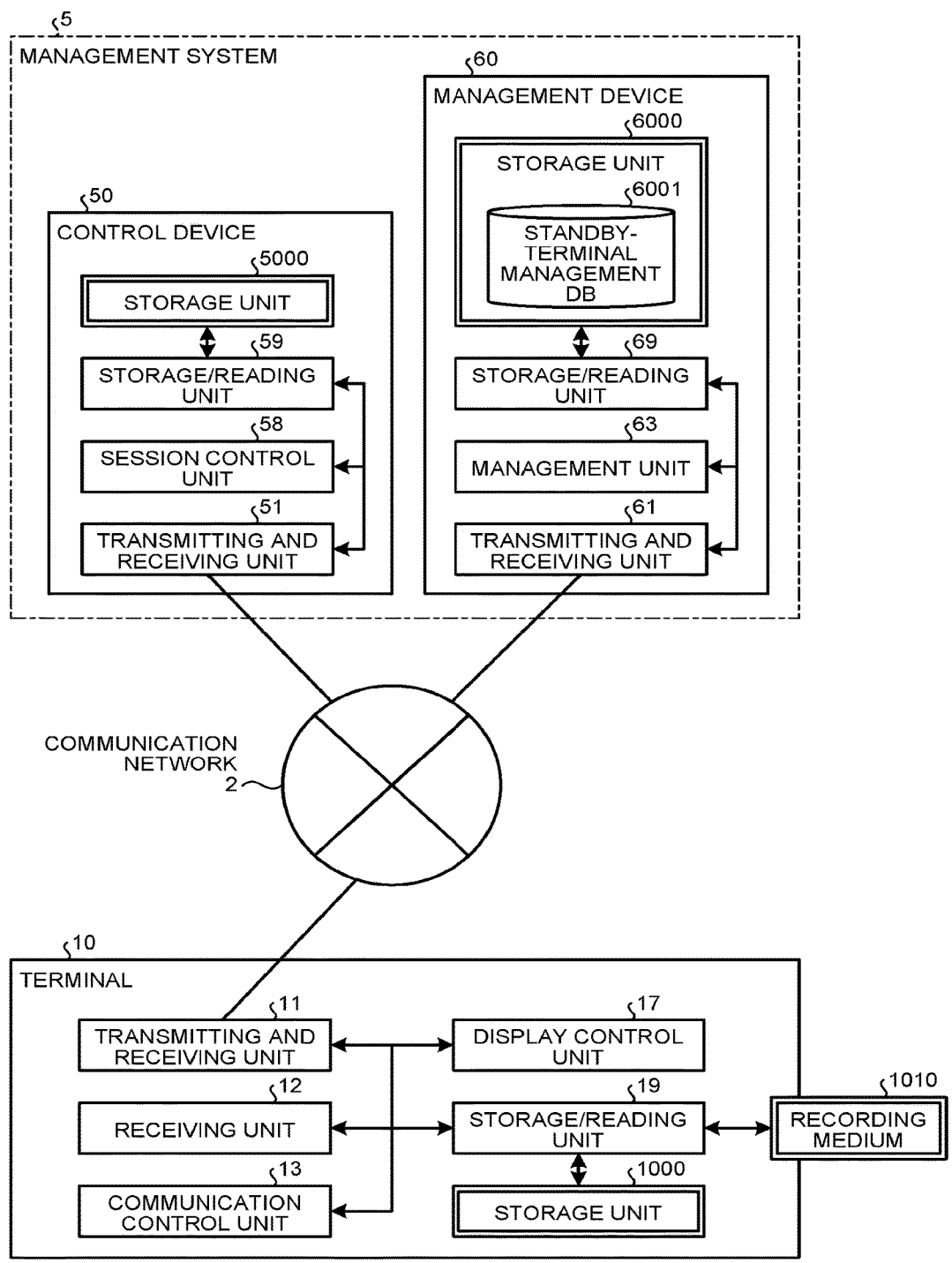
FIG. 5 is a functional block diagram of the terminal, the control device, and the management device in the embodiment.

With reference to FIGS. 3, 4, and 5, the functional configurations in the embodiment will be described next. FIG. 5 is a diagram of functional blocks of the communication system in the embodiment. In the following description, "application" is described being abbreviated to "app"

Functional Configurations of Terminal

The terminal 10 includes a transmitting and receiving unit 11, a receiving unit 12, a communication control unit 13, a display control unit 17, and a storage/reading unit 19. These various units are the functions or the functional means implemented by any of the constituent elements illustrated in FIG. 3 being operated by commands from the CPU 101 in accordance with the terminal program that is loaded onto the RAM 103 from the flash memory 104. In the terminals (10aa, 10bb), installed is a guest app to implement service provided to the guest side in a reception service as a terminal program. In the terminals (10cc, 10dd), installed is a receptionist app to implement service provided to the receptionist side in the reception service as a terminal program. That is, at least a part of the functional configurations of the terminal 10 is implemented by the guest app or the receptionist app.

The terminal 10 further includes a storage unit 1000 structured with the RAM 103 and the flash memory 104. Moreover, in the terminal 10, a recording medium 1010 structured with the recording medium 106 is inserted, and the reading and writing of various types of data is performed by the storage/reading unit 19.

Each Functional Configuration of Terminal

Each of the functional configurations of the terminal 10 will be described in detail next. In the following description, the relation with primary constituent elements to implement each of the functional configurations of the terminal 10 out of the constituent elements illustrated in FIG. 3 will also be described.

The transmitting and receiving unit 11 is implemented by the commands from the CPU 101 and with the network I/F 111, and performs the transmitting and receiving of a various types of data (or information) with the other terminals, the devices, or the system via the communication network 2.

The receiving unit 12 is implemented by the commands from the CPU 101, and receives various operations such as the operation of the operation button 108 by the user, or the depressing of the power switch 109 by the user.

The communication control unit 13 is implemented by the commands from the CPU 101 and with the camera 112 and the imaging element I/F 113, and images a subject and outputs image data that has been obtained by the imaging. The communication control unit 13 is further implemented by the commands from the CPU 101 and with the audio input and output I/F 116, and after converting the voice of the user into an audio signal with the microphone 114, inputs the sound data concerning the audio signal. Moreover, the communication control unit 13 is implemented by the commands from the CPU 101 and with the audio input and output I/F 116, and outputs the audio signal concerning the sound data to the speaker and thereby causes the speaker 115 to output the voice.

The display control unit 17 is implemented by the commands from the CPU 101 and with the display I/F 117, and performs control for transmitting received image data to the display 120.

The storage/reading unit 19 is executed by the commands from the CPU 101 and with the SSD 105 or is implemented by the commands from the CPU 101, and performs storing various types of data in the storage unit 1000 or the recording medium 1010 and reading out various types of data stored in the storage unit 1000 or the recording medium 1010. In the storage unit 1000, a terminal identification (ID) to identify the terminal 10, a password, and others are stored. At least one of the terminal ID and the password may be configured to be stored in the recording medium 1010 and read out by the storage/reading unit 19. The recording medium 1010 in this case is an integrated circuit (IC) card such as a subscriber identity module (SIM) card. The user of the terminal 10 purchases the recording medium 1010, and thereby can receive the provision of communication service from an administrator of the management system 5.

Moreover, in the storage unit 1000, the image data and the sound data received at the time of talking with a destination terminal are stored being overwritten each time they are received. In accordance with the image data before being overwritten, an image is displayed on the display 120, and in accordance with the sound data before being overwritten, the sound is output from the speaker 115.

The terminal ID in the embodiment represents one example of identification information such as languages, characters, symbols, or various marks, which is used to uniquely identify the terminal 10. The terminal ID may be the identification information that is a combination of at least two of the foregoing languages, characters, symbols, and various marks. In place of the terminal ID, a user ID to identify the user of the terminal 10 may be used. In this case, the identification information of the terminal includes not only the terminal ID but also the user ID.

Functional Configurations of Control Device

The control device 50 includes a transmitting and receiving unit 51, a session control unit 58, and a storage/reading unit 59. These various units are the functions or the means implemented by any of the constituent elements illustrated in FIG. 4 being operated by commands from the CPU 501 in accordance with the program for the control device 50 which is loaded onto the RAM 503 from the HD 504. The control device 50 further includes a storage unit 5000 structured with the HD 504.

Each Functional Configuration of Control Device

Each of the functional configurations of the control device 50 will be described in detail next. In the following description, the relation with primary constituent elements to implement each of the functional configurations of the control device 50 out of the constituent elements illustrated in FIG. 4 will also be described.

The transmitting and receiving unit 51 is implemented by the commands from the CPU 501 and with the network I/F 509, and performs the transmitting and receiving of various types of data (or information) with each of the terminals, the devices, or the system via the communication network 2.

The session control unit 58 is implemented by the commands from the CPU 501, and controls a session in which content data is transmitted between the terminals 10. As for the foregoing control, control to establish a session, control to cause the terminal 10 to participate in the established session, control to disconnect the session, and others are included.

The storage/reading unit 59 is implemented by the commands from the CPU 501 and with the HDD 505 or is implemented by the commands from the CPU 501, and performs storing various types of data in the storage unit 5000 and reading out various types of data stored in the storage unit 5000.

Functional Configurations of Management Device

The management device 60 includes a transmitting and receiving unit 61, a management unit 63, and a storage/reading unit 69. These various units are the functions or the means implemented by any of the constituent elements illustrated in FIG. 4 being operated by commands from the CPU 501 in accordance with the program for the management device which is loaded onto the RAM 503 from the HD 504. The management device 60 further includes a storage unit 6000 structured with the HD 504. In the storage unit 6000, DBs configured with respective tables are structured.

Standby-Terminal Management Table

In the storage unit 6000, a standby-terminal management DB 6001 configured with a standby-terminal management table is structured. FIGS. 6A to 6G are conceptual diagrams illustrating the standby-terminal management table. FIGS. 6A to 6G illustrate the transition of information recorded in a single standby-terminal management table. In the fields of guest app in the standby-terminal management table, the terminal IDs of the terminals 10 for which the guest app is being activated out of the terminals 10 waiting for the starting of communication are recorded. In the fields of receptionist app in the standby-terminal management table, the terminal IDs of the terminals 10 for which the receptionist app is being activated out of the terminals 10 waiting for the starting of communication are recorded. Each of the fields in the standby-terminal management table constitutes a queue of the terminals 10 waiting for the starting of communication. In the embodiment, the input and output of the terminal ID to/from each field is performed by first-in first-out in principle. That is, when adding (enqueuing) a terminal ID to each of the fields, it is added to the tail-end record of the fields, and when taking out (dequeuing) a terminal ID from each of the fields, it is taken out from the head record in the fields. The remaining records after dequeuing are moved up in the head direction. Specifically, a terminal ID "01*cc*" that had been added to the fields of receptionist app in the standby-terminal management table is taken out earlier than a terminal ID "01*dd*" that was added later (see FIGS. 6A to 6C).

The terminal ID input to the standby-terminal management table only needs to be the identification information by which the terminal 10 of communication destination is identifiable. Consequently, as long as the terminal 10 of communication destination is identifiable, the terminal ID is not limited to the identification information of the terminal 10 itself. For example, when the identification information of each terminal 10 itself and the user ID of the user of that terminal 10 are managed in association with each other in the management device 60, the user ID can also be used as the terminal ID that can identify the terminal 10 of communication destination. Furthermore, when the identification information of each terminal 10 itself and the account of the app being activated in that terminal 10 are managed in association with each other in the management device 60, the account can also be used as the terminal ID that can identify the terminal 10 of communication destination.

Each Functional Configuration of Management Device

The transmitting and receiving unit 61 is implemented by the commands from the CPU 501 and with the network I/F 509, and performs the transmitting and receiving of various types of data (or information) with the other terminals, the devices, or the system via the communication network 2.

The management unit 63 is implemented by the commands from the CPU 501, and adds or deletes information in the standby-terminal management table, and thereby manages the standby-terminal management table.

The storage/reading unit 69 is implemented by the commands from the CPU 501 and with the HDD 505 or is implemented by the commands from the CPU 501, and performs storing various types of data in the storage unit 6000 and reading out various types of data stored in the storage unit 6000.

Processing or Operation in Embodiment

The processes or the operations of the terminal 10, the relay device 30, the control device 50, the management device 60, and the storage service 70 that constitute the communication system 1 will be described in detail.

Transmission of Status Information

With reference to FIG. 7, the processes in which a terminal (10*cc* or 10*dd*) of the receptionist side transmits status information indicative of a state of being able to respond to a starting request of communication to the management device 60 will be described first. FIG. 7 is a sequence diagram illustrating the processes in which the terminal 10 transmits the status information.

Upon receiving an activation request of the receptionist app based on operated input by a user (receptionist), the receiving unit 12 of the terminal (10*cc* or 10*dd*) activates the receptionist app (Step S1). Afterward, each process in the terminal (10*cc* or 10*dd*) is implemented by the receptionist app.

When the receptionist app is activated, the transmitting and receiving unit 11 transmits a log-in request to the management device 60 (Step S2). This log-in request may include the terminal ID of the terminal (10*cc* or 10*dd*) of the log-in request source, an app ID of the receptionist app being activated in the terminal (10*cc* or 10*dd*), information for authentication, and others. The information for authentication may include a password corresponding to the terminal ID, the account of the app, a password corresponding to the account, and others. In response to this, when the management device 60 succeeds in the authentication of the terminal (10*cc* or 10*dd*), the terminal (10*cc* or 10*dd*) connects to the management device 60. In the same manner, the transmitting and receiving unit 11 transmits a log-in request to the control device 50 (Step S3). In response to this, when the control device 50 succeeds in the authentication of the terminal (10*cc* or 10*dd*), the terminal (10*cc* or 10*dd*) connects to the control device 50. By performing the foregoing log-in process, the management device 60 or the control device 50 of the transmission destination is able to identify the terminal 10 of the transmission source or the app being activated in the terminal 10, without adding the terminal ID, the app ID, and others each time the terminal 10 side transmits information. As for the connection between the terminal 10 and the management device 60 or the connection between the terminal 10 and the control device 50, a real-time connection is used, for example.

Subsequently, when the user of the terminal (10*cc* or 10*dd*) is in a state of being able to start a talk with a guest side, the user inputs information indicative of starting of standby by operating the operation button 108. Consequently, the receiving unit 12 receives the starting of standby (Step S4). The transmitting and receiving unit 11 then transmits, to the management device 60, status information indicative of a state of being "able to respond" to a starting request of communication (Step S5).

The terminal (10*cc* or 10*dd*) transmits the status information to the management device 60 not only when the starting of standby is received, but also each time it turns into a state of being able to respond. For example, when the receiving unit 12 receives an end of a talk (Step S6), the user of the terminal (10*cc* or 10*dd*) is able to start a new talk, and thus the transmitting and receiving unit 11 automatically transmits, to the management device, the status information indicative of being "able to respond" to a starting request of communication (Step S7).

When the user of the terminal (10*cc* or 10*dd*) is in a state of not being able to start a talk with a guest side as in the case of temporarily leaving his/her seat and the like, the user inputs information indicative of not being able to respond by operating the operation button 108. Consequently, the receiving unit 12 receives that a response cannot be made (Step S8). In this case, the transmitting and receiving unit 11 transmits, to the management device 60, status information indicative of a state of being "unable to respond" to a starting request of communication (Step S9).

Figure 8:
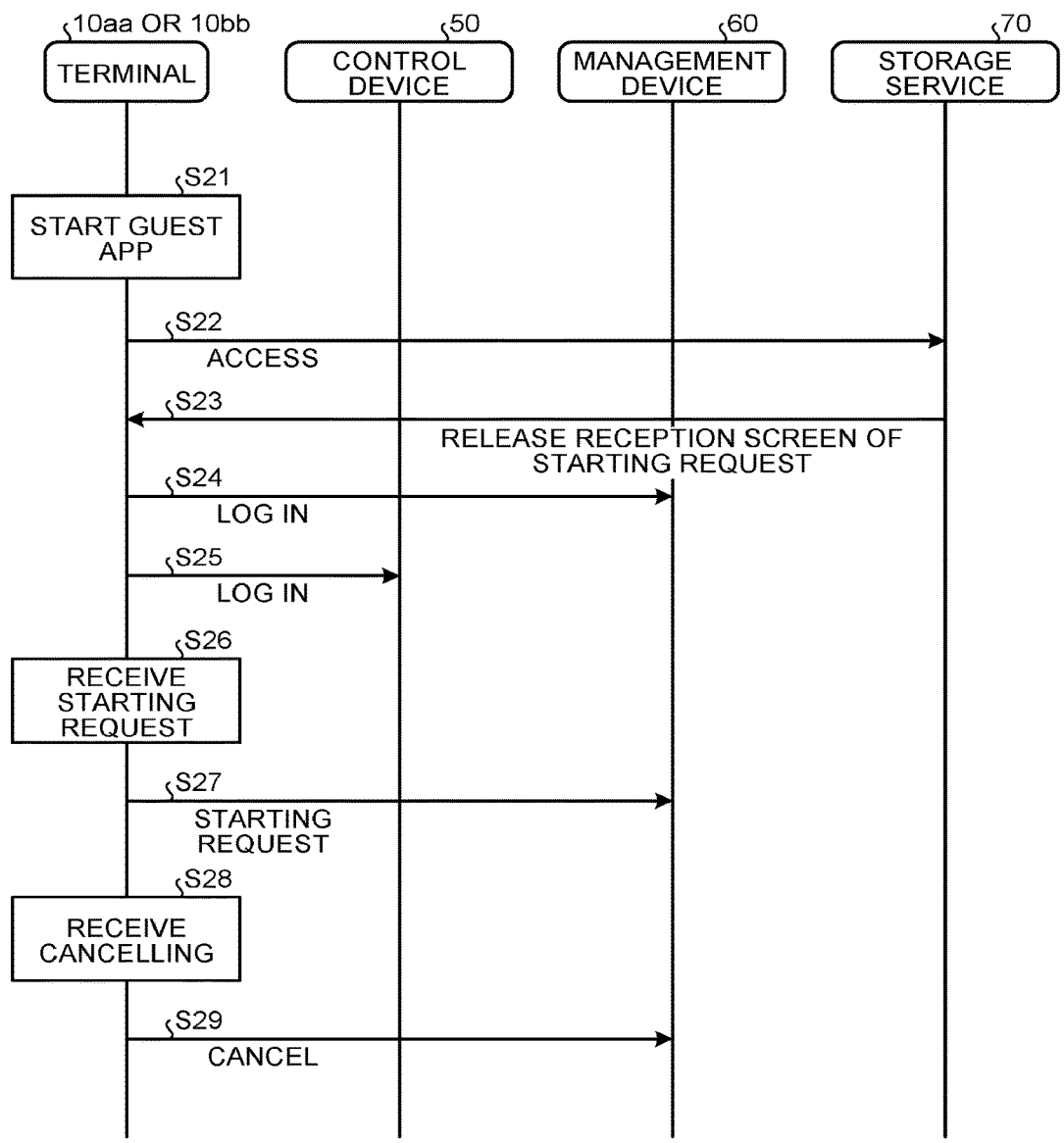
FIG. 8 is a sequence diagram illustrating the processes in which the terminal transmits a starting request of communication.

With reference to FIG. 8, the processes in which a terminal (10*aa* or 10*bb*) of the guest side transmits a starting request of communication to the management device 60 will be described. FIG. 8 is a sequence diagram illustrating the processes in which the terminal 10 transmits a starting request of communication.

Upon receiving an activation request of the guest app based on operated input by a user (guest), the receiving unit 12 of the terminal (10*aa* or 10*bb*) activates the guest app (Step S21). Afterward, each process in the terminal (10*aa* or 10*bb*) is implemented by the guest app.

When the guest app is activated, the transmitting and receiving unit 11 accesses the storage service 70, and requests a reception screen of a starting request of communication (Step S22). In response to this, the storage service 70 releases the reception screen of a starting request of communication to the terminal (10*aa* or 10*bb*) of the request source (Step S23). In the terminal (10*aa* or 10*bb*), the display control unit 17 performs control to output the reception screen of a starting request of communication to the display 120.

The transmitting and receiving unit 11 of the terminal (10*aa* or 10*bb*) transmits, in the same manner as that at Step S2, a log-in request to the management device 60 (Step S24). Note that the app ID included in the log-in request, however, is the app ID of the guest app. In response to the log-in request, when the management device 60 succeeds in the authentication of the terminal (10*aa* or 10*bb*), the terminal (10*aa* or 10*bb*) connects to the management device 60. The transmitting and receiving unit 11 then transmits, in the same manner as that at Step S3, a log-in request to the control device 50 (Step S25). In response to the log-in request, when the control device 50 succeeds in the authentication of the terminal (10*aa* or 10*bb*), the terminal (10*aa* or 10*bb*) connects to the control device 50.

Subsequently, when the user of the terminal (10*aa* or 10*bb*) requests a talk with the receptionist side, the user inputs a starting request from the reception screen of a starting request by operating the operation button 108. Consequently, the receiving unit 12 receives the input of the starting request (Step S26). The transmitting and receiving unit 11 then transmits information indicative of a starting request of communication to the management device 60 (Step S27).

Meanwhile, when the user of the terminal (10*aa* or 10*bb*) cancels a starting request after the starting request, the user inputs information indicative of cancelling from the reception screen of a starting request, by operating the operation button 108. Consequently, the receiving unit 12 receives the input of cancelling (Step S28). In this case, the transmitting and receiving unit 11 transmits information indicative of cancelling of the starting request to the management device 60 (Step S29).

Queue Management

Figure 9:
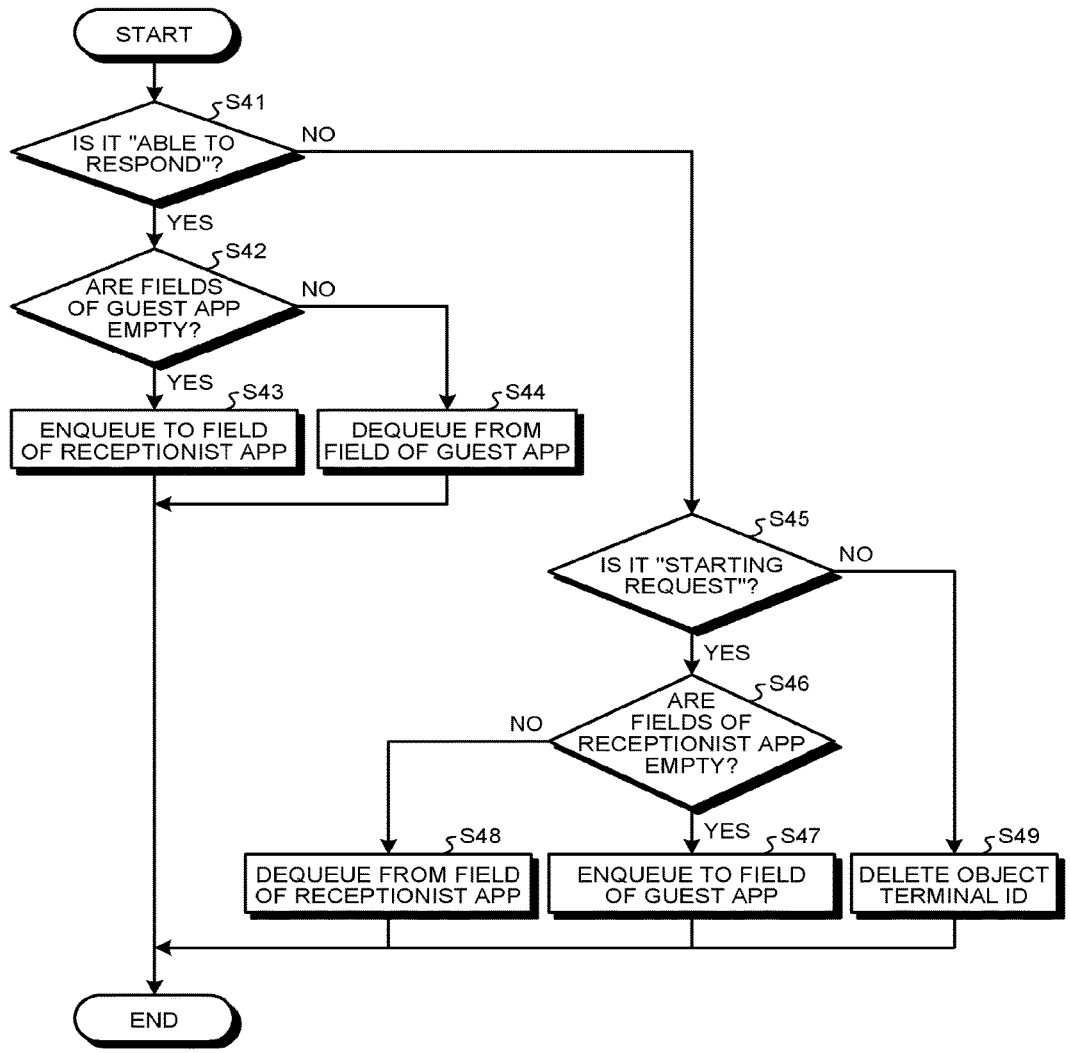
FIG. 9 is a flowchart illustrating the processes of managing queues of terminals 10 that are waiting for the starting of communication.

With reference to FIG. 9, the processes in which the management device 60 manages queues of the terminals 10 waiting for the starting of communication will be described. FIG. 9 is a flowchart illustrating the processes of managing the queues of the terminals 10 that are waiting for the starting of communication.

When the transmitting and receiving unit 61 of the management device 60 receives status information or a starting request transmitted from the terminal 10, the management unit 63 determines whether the information transmitted from the terminal 10 is status information indicating a state of being "able to respond" transmitted by the receptionist app (Step S41).

If the transmitted information is determined to be the status information indicative of a state of being "able to respond" (Yes), the management unit 63 refers to the standby-terminal management table and determines whether the fields of guest app are empty (Step S42).

If the fields of guest app are determined to be empty (Yes), the management unit 63 adds (enqueues) the terminal ID of the terminal 10 of the transmission source of the status information indicative of a state of being "able to respond" to the tail-end record in the fields of receptionist app in the standby-terminal management table (Step S43).

If the fields of guest app are determined not to be empty (No), the management unit 63 takes out (dequeues) the terminal ID from the head record in the fields of guest app in the standby-terminal management table (Step S44).

At Step S41, if the information transmitted from the terminal 10 is determined not to be the status information indicative of a state of being "able to respond" (No), the management unit 63 determines whether the transmitted information is a starting request of communication transmitted by the guest app (Step S45).

If the transmitted information is determined to be a starting request of communication (Yes), then the management unit 63 refers to the standby-terminal management table and determines whether the fields of receptionist app are empty (Step S46).

If the fields of receptionist app are determined to be empty (Yes), the management unit 63 adds (enqueues) the terminal ID of the terminal 10 of the transmission source of the starting request of communication to a tail-end record in the fields of guest app in the standby-terminal management table (Step S47).

If the fields of receptionist app are determined not to be empty (No), the management unit 63 takes out (dequeues) the terminal ID from the head record in the fields of receptionist app in the standby-terminal management table (Step S48).

If the information transmitted from the terminal 10 is determined not to be a starting request of communication (No), that is, when the transmitted information is the status information indicative of a state of being "unable to respond" or the information indicative of cancelling of a starting request, the management unit 63 deletes, from the standby-terminal management table, the terminal ID of the terminal 10 that is the transmission source of the information, as the exception of the first-in first-out processing (Step S49). For example, when the information transmitted from the terminal 10 is the status information indicative of a state of being "unable to respond," the management unit 63 deletes the terminal ID of the terminal 10 of the transmission source from the fields of receptionist app in the standby-terminal management table. When the information transmitted from the terminal 10 is the information indicative of the cancelling of a starting request, the management unit 63 deletes the terminal ID of the terminal 10 of the transmission source from the fields of guest app in the standby-terminal management table.

As in the foregoing, the terminal IDs managed in the standby-terminal management table are updated based on the information transmitted from the terminals 10. For example, while the standby-terminal management table is in a state of being empty, when the status information indicative of a state of being "able to respond" is transmitted from the terminal 10*cc*, by the process at Step S43, the terminal ID "01*cc*" of the terminal 10*cc* is added to a field of receptionist app (see FIG. 6A).

Then, when the status information indicative of a state of being "able to respond" is transmitted from the terminal 10*dd*, by the process at Step S43, the terminal ID "01*dd*" of the terminal 10*dd* is added to the tail-end record in the fields of receptionist app (see FIG. 6B).

Subsequently, when a starting request of communication is transmitted from any of the terminals 10, by the process at Step S48, the terminal ID "01*cc*" of the terminal 10*cc* is taken out from the head record in the fields of receptionist app (see FIG. 6C).

Then, when a starting request of communication is transmitted from any of the terminals 10, by the process at Step S48, the terminal ID "01*dd*" of the terminal 10*dd* is taken out from the head record in the fields of receptionist app (see FIG. 6D).

Subsequently, when a starting request of communication is transmitted from the terminal 10*aa*, by the process at Step S47, the terminal ID "01*aa*" of the terminal 10*aa* is added to a field of guest app (see FIG. 6E).

Then, when a starting request of communication is transmitted from the terminal 10*bb*, by the process at Step S47, the terminal ID "01*bb*" of the terminal 10*bb* is added to a tail-end record in the fields of guest app (see FIG. 6F).

Subsequently, in response to receiving of the end of a talk, when the status information indicative of a state of being "able to respond" is newly transmitted from the terminal 10*cc*, by the process at Step S44, the terminal ID "01*aa*" of the terminal 10*aa* is taken out from the head record in the fields of guest app (see FIG. 6F).

Then, in response to receiving of the end of a talk, when the status information indicative of a state of being "able to respond" is transmitted from the terminal 10*dd*, by the process at Step S44, the terminal ID "01*bb*" of the terminal 10*bb* is taken out from the head record in the fields of guest app. Consequently, the standby-terminal management table is in a state of being empty again. At this time, the terminals 10 waiting for the starting of communication are no longer present on the receptionist side or on the guest side.

Session Establishment

Figure 10:
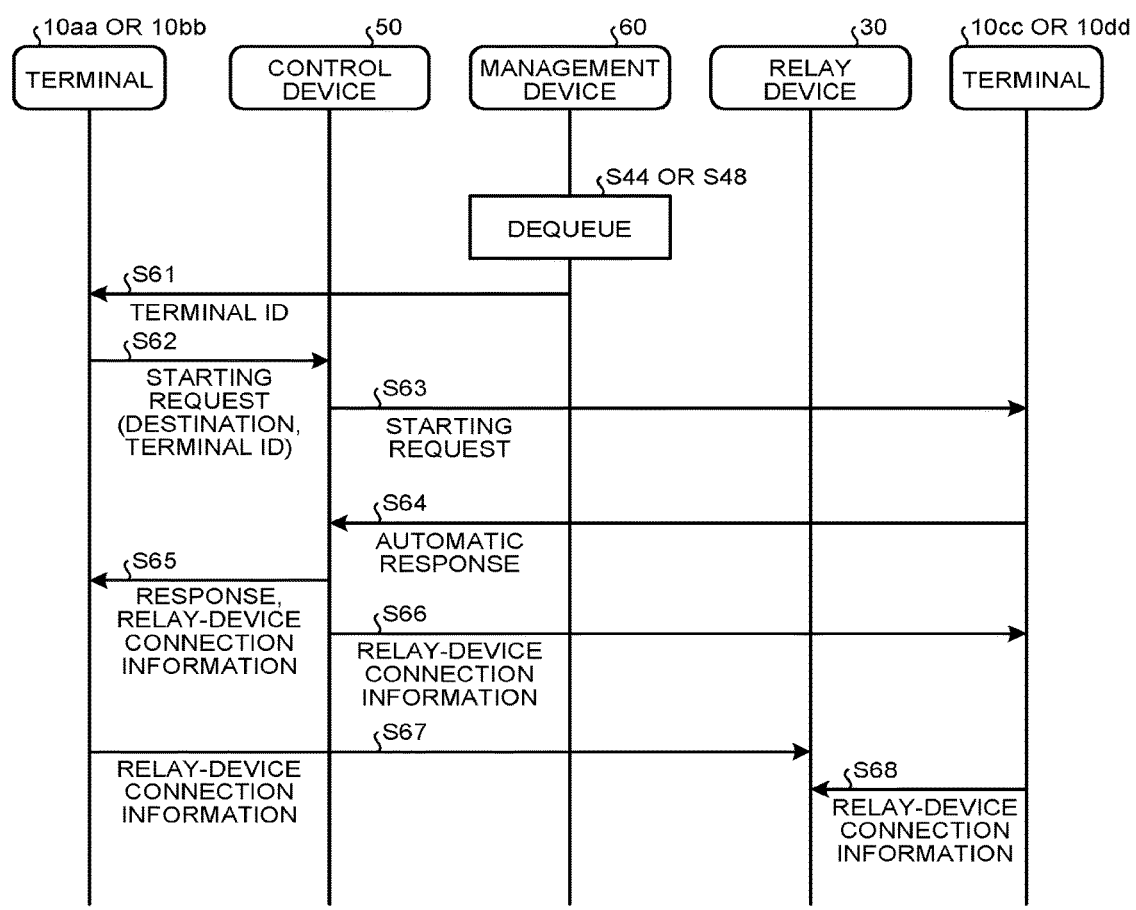
FIG. 10 is a sequence diagram illustrating the processes of establishing a session.

With reference to FIG. 10, the process of establishing a session between the terminals 10 based on the control by the control device 50 will be described. FIG. 10 is a sequence diagram illustrating the processes of establishing a session.

At Step S44 and Step S48, when the terminal ID is taken out (dequeued) from the standby-terminal management table, the management system 5 performs control such that the dequeued terminal 10 starts to perform communication. As this control, the transmitting and receiving unit 61 of the management device 60 in the embodiment transmits, to the terminal 10 of the guest side, the terminal ID of the terminal 10 of destination to cause it to issue a starting request (Step S61). For example, with the reception of status information indicative of a state of being "able to respond" as a trigger, when a terminal ID in the field of guest app is dequeued (see Step S44), the transmitting and receiving unit 61 transmits, to the terminal 10 of the guest side that is identified by the dequeued terminal ID, the terminal ID of the terminal 10 of the receptionist side that has transmitted the status information indicative of a state of being "able to respond". Meanwhile, with the reception of a starting request as a trigger, when a terminal ID in the field of receptionist app is dequeued (see Step S48), the transmitting and receiving unit 61 transmits, to the terminal 10 of the guest side that is a starting request source that has transmitted the starting request, the terminal ID of the dequeued terminal 10 of the receptionist side.

The transmitting and receiving unit 11 of the terminal 10 of the guest side, upon receiving the terminal ID transmitted from the management device 60, automatically transmits, to the control device 50, a starting request of communication that includes the terminal ID received as the information indicative of destination (Step S62). The control device 50 performs control by a known call control method to establish a session to transmit content data between the terminal 10 of the starting request source and the terminal 10 of the destination. In this case, the transmitting and receiving unit 51 of the control device 50 transmits the starting request transmitted from the terminal 10 of the guest side, to the terminal 10 of the destination on the receptionist side identified by the terminal ID included in the starting request, for example (Step S63). The transmitting and receiving unit 11 of the terminal 10 of the receptionist side, upon receiving the starting request of communication transmitted from the control device 50, automatically transmits, to the control device 50, a response that the starting of communication is permitted (Step S64).

When the transmitting and receiving unit 51 of the control device 50 receives the response that the starting of communication is permitted, the session control unit 58 causes the transmitting and receiving unit 11 to transmit, to the terminal 10 of the starting request source on the guest side, the response transmitted from the terminal 10 of the destination, and relay-device connection information for connecting to the relay device 30 (Step S65). Moreover, the session control unit 58 causes the transmitting and receiving unit 11 to transmit, to the terminal 10 of the destination on the receptionist side, the relay-device connection information for connecting to the relay device (Step S66). The above-described relay-device connection information may include the IP address, authentication information, port number, and others of the relay device 30.

The respective transmitting and receiving units 11 of the terminals 10 of the guest side and the receptionist side transmit, to the relay device 30, the relay-device connection information transmitted from the management device 60 (Step S67, Step S68). Consequently, both the terminal 10 of the guest side and the terminal 10 of the receptionist side connect to the relay device 30, and thereby a session between the terminal 10 of the guest side and the terminal 10 of the receptionist side is established. After the session is established, the terminal 10 of the guest side and the terminal 10 of the receptionist side transmit image data and sound data generated in the respective terminals 10 themselves to the relay device 30. The relay device 30 transmits the image data and the sound data that have been transmitted from one of the terminals 10, to the other terminal 10. As a consequence, the image data and the sound data are to be transmitted reciprocally between the terminal 10 of the guest side and the terminal 10 of the receptionist side.

Effects of Embodiment

The effects of the above-described embodiment will be described.

The standby-terminal management DB 6001 is constructed in the storage unit 6000 of the management device 60 configuring the management system 5. A terminal ID (an example of identification information of a communication terminal classified into a first group) of the terminal 10 in the guest side can be managed in the field (an example of the first management unit) of a guest app on a standby-terminal management table configuring the standby-terminal management DB 6001. A terminal ID (an example of identification information of a communication terminal classified into a second group) of the terminal 10 in the receptionist side can be managed in the field (an example of the second management unit) of a receptionist app on the standby-terminal management table.

When the terminal 10 in the guest side requests for starting of communication, if one or more terminal IDs are managed in the field of the receptionist app, the management unit 63 (an example of the updating unit) of the management device 60 deletes any terminal ID managed in the field of the receptionist app. When the terminal 10 in the guest side requests for the starting of the communication, if no terminal IDs are managed in the field of the receptionist app, the management unit 63 adds a terminal ID of the terminal 10 in the guest side requesting for the starting of the communication to the field of the guest app. When the terminal 10 in the receptionist side turns into a state of being able to respond to the starting request of communication, if one or more terminal IDs are managed in the field of the guest app, the management unit 63 deletes any terminal ID managed in the field of the guest app. When the terminal 10 in the receptionist side turns into a state of being able to respond to the starting request of communication, if no terminal IDs are managed in the field of the guest app, the management unit 63 adds a terminal ID of the terminal 10 in the receptionist side having turned into a state of being able to respond to the starting request of communication to the field of the receptionist app. In this process, the management unit 63 updates information managed in the field of the guest app or in the field of the receptionist app.

The field of the guest app manages a queue in the start-requesting side, whereas the field of the receptionist app manages a queue in the incoming call responding side. With this configuration, the management device 60 can easily manage a connection between terminals 10 even when waiting is caused in the start-requesting side or in the incoming call responding side.

When the management unit 63 of the management device 60 deletes a terminal ID managed in the field of the guest app or in the field of the receptionist app, the control device 50 (an example of the session control unit) configuring the management system 5 executes control for establishing a session to transmit content data between the terminal 10 in the guest side requesting for the starting of the communication and the terminal 10 in the receptionist side in a state of being able to respond to the starting request of communication. With this process, the dequeued terminal 10 is controlled to start communication.

The transmitting and receiving unit 61 (an example of the start request receiving unit) of the management device 60 receives a starting request of communication based on information transmitted from the terminal 10 in the guest side. The transmitting and receiving unit 61 (an example of the receiving unit) receives status information indicative of a state of being "able to respond" to the starting request of communication. The management unit 63 of the management device 60 updates the field of the guest app or the field of the receptionist app after the transmitting and receiving unit 61 receives the starting request of communication or receives the status information. With this process, the management device 60 is capable of managing a queue of the terminal 10 waiting for starting of communication in association with a call control.

If a plurality of terminal IDs are managed in the field of the guest app or in the field of the receptionist app, the management unit 63 deletes the earliest added terminal ID from among the terminal IDs. With this process, the management device 60 can start communication in order from the terminal 10 with a longer waiting time.

The receiving unit 12 (an example of the operation input receiving unit) of the terminal 10 receives an operation input of an end of talk (an example of information relating to an end of communication with a communication terminal classified into the first group) with the guest side. When the receiving unit 12 receives the operation input, the transmitting and receiving unit 11 (an example of the transmitting unit) transmits status information indicative of a state of being "able to respond" to the starting request of communication to the management device 60. With this process, the terminal 10 in the receptionist side can wait for starting of communication with another terminal 10 in the guest side soon after the end of communication with the terminal 10 in the guest side.

Supplement to Embodiment

In the above-described embodiment, a situation in which the management device 60 is a different apparatus from the control device 50 has been exemplified. However, the present invention is not limited to such an embodiment. For example, the control device 50 may include the above-described various functional units of the management device 60.

In the above-described embodiment, a situation has been exemplified in which the guest app is installed in the terminals (10aa, 10bb) and the receptionist app is installed in the terminals (10cc, 10dd). The present invention, however, is not limited to such an embodiment. For example, the terminals (10aa, 10bb, 10cc, 10dd) may be installed with an identical app for reception service. In this case, the app installed in the terminal 10 selectively implements, based on the selection of a role by the user or on the information indicative of a role recorded on the detachable recording medium 1010, the functions by the guest app in the above-described embodiment or the functions by the receptionist app.

As described above, according to the present invention, it has an effect in that management of a connection between communication terminals can be facilitated even when waiting is caused in the start-requesting side or in the incoming call responding side.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A management system comprising:
processing circuitry configured to
manage identification information, in a first management memory area, of at least one communication terminal classified into a first group by determining when the at least one communication terminal classified into the first group is to be added or deleted from first management memory area;
perform second management to manage identification information, in a second management memory area, of at least one communication terminal classified into a second group by determining when the at least one communication terminal classified into the second group is to be added or deleted from first management memory area, wherein each of the at least one communication terminal classified into the first group is configured to transmit a request for starting communication with any communication terminal classified into the second group without specifying a particular communication terminal classified into the second group; and
update information managed the first management memory area or the second management memory area
by deleting any piece of the identification information managed the second management memory area if one or more pieces of the identification information are managed in the second management memory area when a communication terminal classified into the first group transmits a request for starting communication,
by adding identification information of a communication terminal of a source of a starting request of communication to the first management memory area if no pieces of the identification information are managed in the second management memory area when the communication terminal classified into the first group transmits the request for starting communication,
by deleting any piece of the identification information managed in the first management memory area if one or more pieces of the identification information are managed in the first management memory area when a communication terminal classified into the second group turns into a state of being able to respond to the request for starting communication, and
by adding identification information of a communication terminal classified in to the second group, having turned into a state of being able to respond, to the second management if no pieces of the identification information are managed in the first management memory area when the communication terminal classified into the second group turns into the state of being able to respond to the request for starting communication,
the processing circuitry being further configured to, when the identification information is deleted, execute control for establishing a video communication session to transmit content data between the at least one communication terminal that is classified into the first group and has transmitted the request for starting communication and the communication terminal that is classified into the second group and has turned into the state of being able to respond to the request for starting communication.

2. The management system according to claim 1, the processing circuitry being further configured to:
receive the request for starting communication,
receive status information indicative of the state of being able to respond to the starting request of communication, and
update information managed in the first management memory area or the second management after the start request receiving the request for starting communication or the the status information.

3. A communication terminal comprising:
processing circuitry configured to
receive an operation input of information relating to an end of communication with a communication terminal classified into the first group; and
transmit, to the management system according to claim 2, the status information indicative of the state of being able to respond to the starting request of communication, after receiving the operation input.

4. The management system according to claim 1, wherein, when a plurality of pieces of the identification information are managed in the first management memory area or the second management, the processing circuitry deletes earliest added identification information from among the pieces of the identification information.

5. A communication system comprising:
the management system according to claim 1;
a communication terminal classified into the first group; and
a communication terminal classified into the second group.

6. The communication system according to claim 5, wherein
the communication terminal classified into the first group includes
processing circuitry configured to transmit information indicative of the starting request of communication to the management system, and
the communication terminal classified into the second group includes:
processing circuitry configured to
receive an operation input of information relating to an end of communication with the communication terminal classified into the first group; and
transmit, to the management system, the status information indicative of the state of being able to respond to the starting request of communication, after receiving the operation input.

7. A method of managing communication terminals, the method comprising:
causing a management system that includes processing circuitry configured to manage identification information, in a first management memory area, of at least one communication terminal classified into a first group by determining when the at least one communication terminal classified into the first group is to be added or deleted from first management memory area and manage identification information of a communication terminal, in a second management memory area, classified into a second group by determining when the at least one communication terminal classified into the second is to be added or deleted from second management memory area, wherein each of the at least one communication terminal classified into the first group is configured to transmit a request for starting communication with any communication terminal classified into the second group without specifying a particular communication terminal classified into the second group, and to update information managed in the first management memory area or the second management memory area,
by deleting any piece of the identification information managed in the second management memory area if one or more pieces of the identification information are managed in the second management memory area when a communication terminal classified into the first group transmits a request for starting communication, by adding identification information of a communication terminal of a source of a starting request of communication to the first management memory area if no pieces of the identification information are managed in the second management memory area when the communication terminal classified into the first group transmits the request for starting communication, by deleting any piece of the identification information managed in the first management memory area if one or more pieces of the identification information are managed in the first management memory area when a communication terminal classified into the second group turns into a state of being able to respond to the request for starting communication, and by adding identification information of a communication terminal classified in to the second group, having turned into a state of being able to respond, to the second management memory area if no pieces of the identification information are managed in the first management memory area when a communication terminal classified into the second group turns into the state of being able to respond to the request for starting communication, the method further including, when the identification information is deleted, executing control for establishing a video communication session to transmit content data between the communication terminal that is classified into the first group and has transmitted the request for starting communication and the communication terminal that is classified into the second group and has turned into the state of being able to respond to the request for starting communication.

8. The method of managing communication terminals according to claim 7, further comprising causing the communication terminal classified into the second group to perform receiving an operation input of information relating to an end of communication with the communication terminal classified into the first group; and transmitting status information indicative of a state of being able to respond to the request for starting communication to the management system after the operation input is received at the receiving.

9. A non-transitory computer-readable medium including programmed instructions, the instructions causing the management system to perform a method of managing communication terminals comprising:

causing a management system that includes processing circuitry configured to perform first management configured to manage identification information, in a first management memory area, of at least one communication terminal classified into a first group by determining when the at least one communication terminal classified into the first group is to be added or deleted from first management memory area and second management configured to manage identification information, in a second management memory area, of at least one communication terminal classified into a second group by determining when the at least one communication terminal classified into the second group is to be added or deleted from second management memory area, wherein each of the at least one communication terminal classified into the first group is configured to transmit a request for starting communication with any communication terminal classified into the second group without specifying a particular communication terminal classified into the second group, and to update information managed in the first management memory area or the second management memory area, by deleting any piece of the identification information managed in the second management memory area if one or more pieces of the identification information are managed in the second management memory area when a communication terminal classified into the first group transmits a request for starting communication, by adding identification information of a communication terminal of a source of a starting request of communication to the first management memory area if no pieces of the identification information are managed in the second management memory area when the communication terminal classified into the first group transmits the request for starting communication, by deleting any piece of the identification information managed in the first management memory area if one or more pieces of the identification information are managed in the first management memory area when a communication terminal classified into the second group turns into a state of being able to respond to the request for starting communication, and by adding identification information of a communication terminal classified in to the second group, having turned into a state of being able to respond, to the second management memory area if no pieces of the identification information are managed in the first management memory area when a communication terminal classified into the second group turns into the state of being able to respond to the request for starting communication, the method further including, when the identification information is deleted, executing control for establishing a video communication session to transmit content data between the communication terminal that is classified into the first group and has transmitted the request for starting communication and the communication terminal that is classified into the second group and has turned into the state of being able to respond to the request for starting communication.

* * * * *